Aug. 9, 1966  F. W. R. STARP  3,264,966
INTERLOCK FOR CAMERA CONTROLS
Filed April 12, 1963

INVENTOR.
Franz W. R. Starp
BY
Arthur A. March
ATTORNEYS

United States Patent Office 3,264,966
Patented August 9, 1966

3,264,966
INTERLOCK FOR CAMERA CONTROLS
Franz W. R. Starp, Calmbach (Enz), Germany, assignor to Alfred Gauthier G.m.b.H., Calmbach (Enz), Germany, a corporation of Germany
Filed Apr. 12, 1963, Ser. No. 272,636
Claims priority, application Germany, Apr. 13, 1962, G 34,720
2 Claims. (Cl. 95—64)

This invention relates to an interlock connected to controls of the type used in cameras which include means for both manual and automatic setting of the diaphragm aperture and shutter speed.

In modern cameras having built-in exposure meters and means linking the exposure meter to the shutter operating mechanism to control shutter speed and the diaphragm aperture in accordance with the illumination of the scene to be photographed, as well as the usual manual controls for the shutter speed and the diaphragm aperture, it is important to prevent improper operation such as would occur, for example, if the operator set the diaphragm control to a manually chosen position but inadvertently left the shutter speed control in its automatic position. It is also important to prevent the converse from taking place.

In accordance with the present invention a separate interlock is provided which engages both the diaphragm control and the shutter speed control when they are set to their automatic positions and which pushes either of these controls out of its automatic position when the other control is manually moved from its automatic position. The interlock comprises a pair of members which move as a unit and which engage suitably shaped receptacles on the controls. The members are so shaped and located that movement of either of the controls releases both of the members, causing the one that engages the other control to shift the latter out of its automatic position.

The invention will be described in greater detail in the following specification together with the drawing in which.

Figure 1:
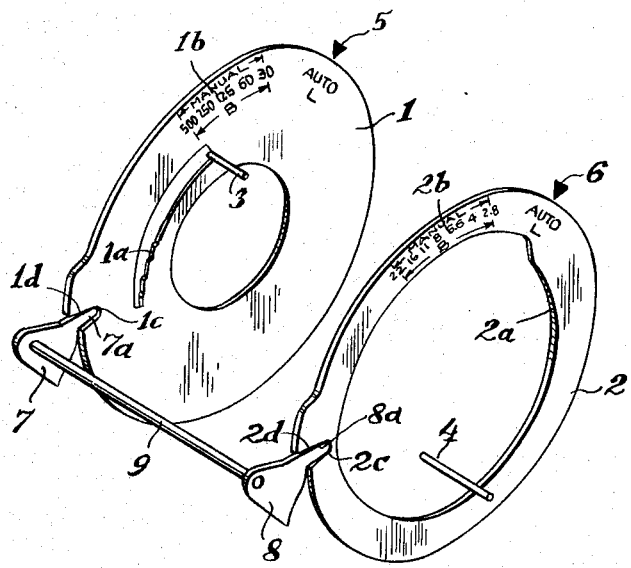
FIG. 1 shows a perspective view of the interlock of this invention and the shutter speed control and the diaphragm aperture control with which the interlock works.

In FIG. 1 the two controls shown are a shutter speed control 1 for controlling the shutter speed, or exposure duration, of a photographic camera shutter and a diaphragm aperture control 2, both in the form of rings or annular disks. The camera of which these controls are a part is not shown in detail in the drawing because the remainder of it is substantially similar to known cameras of the type in which it is possible to take photographs with manual exposure setting, i.e., with both the shutter speed and the diaphragm aperture being set manually at will, or, alternatively, with automatic exposure setting in response to the intensity of light from the scene to be photographed. The automatic exposures may be made either according to a predetermined program of correlated shutter speeds and diaphragm settings or at a constant exposure time suitable for effecting exposures by hand, for example, at 1/30 sec. For this purpose, the two controls 1 and 2 for shutter speed and diaphragm are provided, respectively, with cams 1a and 2a for manual exposure setting, as well as with a shutter speed setting scale 1b and an aperture setting scale 2b. A pin 3 cooperates with the cam 1a, in a manner known per se, to control a shutter speed escapement mechanism of known construction built into the camera. The setting of the diaphragm is effected, in a manner known per se, by a linkage that includes a pin 4 which is controlled by the cam 2a.

In addition to the "Manual" setting range, which extends over the respective setting scale 1b or 2b, the controls 1 and 2 each have a fixed "Auto" setting position, for automatic exposure setting of the camera. Within the "Auto" setting position, the exposure setting is effected in response to the measured result of a light-intensity measuring device, which is linked to a program setting member as is now well known in the camera art. The reference points for the exposure setting are fixed setting marks 5 and 6 which are arranged on the camera and which are associated with the two controls 1 and 2. The locations of the marks 5 and 6 can be made to coincide, so that the two marks can be replaced by a single mark.

In order to avoid wrong settings of the controls 1 and 2, the invention provides for the arrangement of a device, which cooperates with the controls and which, when the camera is switched from one working range to the other, always ensures the joint switching of the controls to the mutually corresponding setting ranges or setting positions. In the embodiment shown, this device consists of two members 7 and 8, which are associated, respectively, with the controls 1 and 2 and which are non-rotatably arranged on a shaft 9 that is free to rotate about fixed bearings. The members 7 and 8, in turn, have radially extending fingers 7a and 8a, while the controls 1 and 2 for exposure time and diaphragm are provided, respectively, with stop edges 1d and 2d that extend beyond their outer concentric circumferences and which are adjacent to recesses 1c and 2c. The shapes of the fingers 7a and 8a as well as their arrangements with respect to the openings 1c and 2c are such that they fit into the openings 1c and 2c when both controls 1 and 2 are set in their "Auto" setting positions, as is apparent in FIGS. 1 and 2, but are out of engagement when the controls are in their "Manual" setting range, as is shown in FIG. 3. In the latter position of the segments 7 and 8, the controls 1 and 2 can be moved manually relatively to each other at will.

Figure 2:
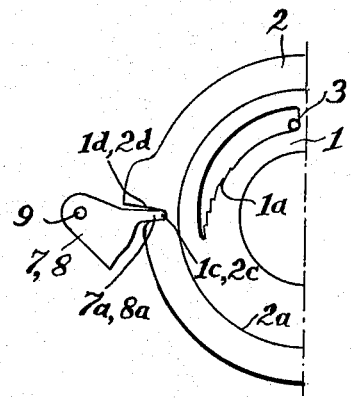
FIG. 2 shows a partial front view of the controls of FIG. 1 both set to their automatic positions.
Figure 3:
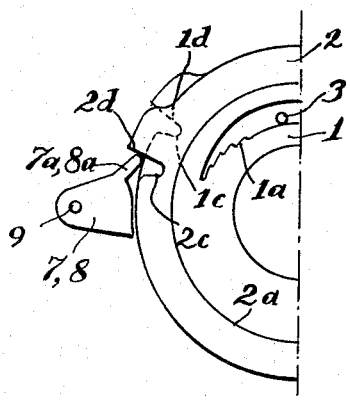
FIG. 3 shows a partial front view as in FIG. 2 but with the controls moved out of their automatic positions.

The operation of the above-described embodiment is as follows:

When the two controls 1 and 2 are in their "Auto" setting positions, the fingers 7a and 8a fit into the openings 1c and 2c of the setting members, as shown in FIGS. 1 and 2. As has already been stated, in this setting position of the controls 1 and 2, both the shutter speed and the diaphragm aperture size are set automatically by linkages connected to a light-intensity measuring device.

But if the photographer intends to take photographs with manual setting of the controls 1 and 2, then both of these controls, and not just one of them, must be moved to their manual setting ranges. In accordance with the present invention, this can be done simply by rotating either one of the controls 1 or 2. For example, if the shutter speed control 1 is rotated clockwise, which is the only direction that it can move from the "Auto" position, the finger 7a will be rotated counterclockwise because of its engagement with the opening 1c. This rotates the shaft 9 counterclockwise, and the member 8 with its finger 8a rotates in the same direction. Finger 8a, in turn, engages the opening 2c of the diaphragm control 2 so that rotation of the finger causes it to push against the side of the opening 2c and thus rotate the diaphragm control 2 clockwise. Because of the fact that the stop edge 2d is located immediately adjacent to the opening 2c, the control 2 will be pushed slightly farther than it would otherwise.

Once both the fingers 7a and 8a have become completely disengaged from the respective openings 1c and 2c, the two controls 1 and 2 can be moved relatively to each other, in which case the photographer merely has to place the shutter speed and diaphragm values indicated on the setting scales 1b and 2b opposite the fixed setting marks 5 and 6. While the cam 1a of the shutter speed control 1 sets the shutter escapement mechanism by way of the pin 3, the setting of the diaphragm is effected by means of the cam 2a of the setting member 2 by means of the pin 4.

If the photographer wants to return to fully automatic exposure setting, he must at first rotate at least one of the two controls 1 or 2, for instance the control 2 in the counterclockwise direction until its stop edge 2d engages the finger 8a of the segment 8. This terminates, temporarily, the rotary motion of the control 2 until the control 1 is also rotated clockwise so that its stop edge 1d engages the finger 7a of the segment 7. This produces a setting position of the controls 1 and 2, in which the two openings 1c and 2c are directly opposite the fingers 7a and 8a of the segments 7 and 8. By rotating the two controls jointly, or by rotating either one of them, in the counterclockwise direction, they can both be moved into their fixed "Auto" setting positions in which both of the fingers 7a and 8a extend into the openings 1c and 2c of the controls. Thus, neither one of the two controls 1 and 2 can be moved into or out of its fixed setting position without taking along the other control.

The present invention is in no way limited to use in a camera having two settable or switchable controls for exposure time and diaphragm, since the same advantages can be obtained by applying same interlock to other devices having controls adapted to be set at similar setting positions or setting ranges. For example, in a setting device having controls for setting the diaphragm and the focus, specially designated, fixed setting positions of the controls may be provided for carrying out snapshots, where the diaphragm and focus are always fixed at two specific, mutually associated values, while the limited setting ranges of the controls might serve to set any desired combinations of diaphragm/focus values.

I claim:

1. In a photographic camera having first and second controls, each of which can be set to at least a first range and a second range, the first range of said first control being related to the first range of said second control and the second range of said first control being related to the second range of said second control, an interlock comprising: a first member engaging said first control to be rotated thereby when said first control passes from one of its ranges to the other; a second member engaging said second control to be rotated thereby when said second control passes from one of its ranges to the other; and a non-rotatable connection between said second member and said first member so that both of said members must rotate together.

2. In a photographic camera having first and second controls, each of which can be set to at least a first range and a second range, the first range of said first control being related to the first range of said second control and the second range of said first control being related to the second range of said second control, an interlock comprising: a first member; a first projection extending therefrom and engaging said first control to rotate said first member when said first control passes from one of its ranges to the other; a second member; a second projection extending therefrom and engaging said second control to be rotated thereby when said second control passes from one of its ranges to the other; and pivotally supported means non-rotatably connected to said first member and to said second member so that both of said members must rotate together.

References Cited by the Examiner

UNITED STATES PATENTS 3,039,376   6/1962   Sommer _____ 95—64

NORTON ANSHER, *Primary Examiner.*

C. B. PRICE, *Assistant Examiner.*